(12) United States Patent
Wang et al.

(10) Patent No.: US 12,011,839 B1
(45) Date of Patent: Jun. 18, 2024

(54) THREE-DIMENSIONAL SCANNING SYSTEM AND SCANNING PATH PLANNING METHOD THEREOF

(71) Applicant: SCANTECH (HANGZHOU) CO., LTD., Hangzhou (CN)

(72) Inventors: Jiangfeng Wang, Hangzhou (CN); Shangjian Chen, Hangzhou (CN); Chuanpeng Jiang, Hangzhou (CN); Zhe Zhang, Hangzhou (CN); Jun Zheng, Hangzhou (CN)

(73) Assignee: SCANTECH (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 18/452,400

(22) Filed: Aug. 18, 2023

(30) Foreign Application Priority Data

Feb. 15, 2023 (CN) .......................... 202310167066.9

(51) Int. Cl.
*B25J 9/16* (2006.01)

(52) U.S. Cl.
CPC .......... *B25J 9/1697* (2013.01); *B25J 9/1664* (2013.01)

(58) Field of Classification Search
CPC ...... B25J 9/1697; B25J 9/1664; B25J 9/0096; B25J 9/046; B25J 13/085; B25J 15/103; B25J 19/023; H04N 13/296; H04N 13/106; H04N 13/207; H04N 13/271; G01B 11/24; G01G 19/52; G01L 5/00; G01L 5/009

See application file for complete search history.

(56) References Cited

U.S. PATENT DOCUMENTS

| 5,331,770 A * | 7/1994 | Ichinohe | B24B 27/033 451/21 |
| 2018/0286119 A1* | 10/2018 | Felip Leon | B25J 13/085 |
| 2019/0087976 A1* | 3/2019 | Sugahara | G06T 7/73 |

(Continued)

FOREIGN PATENT DOCUMENTS

| CN | 110000786 A | 7/2019 |
| CN | 111958604 A | 11/2020 |

(Continued)

OTHER PUBLICATIONS

Office Action issued in Chinese Application No. 202310433144.5, dated Jul. 12, 2023 (10 pages).

(Continued)

*Primary Examiner* — Abby Y Lin
*Assistant Examiner* — Dylan M Katz
(74) *Attorney, Agent, or Firm* — Osha Bergman Watanabe & Burton LLP

(57) ABSTRACT

A three-dimensional scanning system, a scanning path planning method, and a three-dimensional scanning method are provided. The three-dimensional scanning system includes a control apparatus configured to determine a planned scanning path for a to-be-measured object based on a historical scanning path of an object type to which the current to-be-measured object belongs and according to a historical pose and a current pose of a rotary table carrying the to-be-measured object. The three-dimensional scanning system further includes a mechanical arm that includes a gripping end for gripping a scanner to drive the scanner to scan the to-be-measured object according to the planned scanning path under control of the control apparatus.

17 Claims, 4 Drawing Sheets

(56) References Cited

U.S. PATENT DOCUMENTS

| | | | | |
|---|---|---|---|---|
| 2020/0070282 A1* | 3/2020 | Takeda | ................ | B23K 26/042 |
| 2020/0094997 A1* | 3/2020 | Menon | ..................... | B65B 5/08 |
| 2022/0250183 A1* | 8/2022 | Knoener | ................ | B25J 19/023 |
| 2023/0166399 A1* | 6/2023 | Fuhlbrigge | ............ | G05B 19/42 |
| | | | | 700/253 |
| 2023/0286143 A1* | 9/2023 | Maruno | .................. | B25J 9/163 |
| | | | | 700/245 |

FOREIGN PATENT DOCUMENTS

| | | |
|---|---|---|
| CN | 112161619 A | 1/2021 |
| CN | 112775959 A | 5/2021 |
| CN | 113664838 A | 11/2021 |
| CN | 114505865 A | 5/2022 |
| CN | 114739405 A | 7/2022 |
| TW | I787107 B | 12/2022 |

OTHER PUBLICATIONS

Office Action issued in Chinese Application No. 202310433144.5, dated Jun. 2, 2023 (14 pages).
Office Action issued in Chinese Application No. 202310433144.5, dated Jun. 26, 2023 (11 pages).

* cited by examiner

THREE-DIMENSIONAL SCANNING SYSTEM AND SCANNING PATH PLANNING METHOD THEREOF

TECHNICAL FIELD

The present application relates to the technical field of three-dimensional scanning, in particular to a three-dimensional scanning system and a scanning path planning method of the three-dimensional scanning system.

BACKGROUND

Three-dimensional scanning technology is a type of technology integrating light, machine, electricity, software, etc., mainly used for scanning a spatial shape, a structure and a color of an object, so as to obtain spatial coordinates of surface(s) of the object. The three-dimensional scanning technology can be used for three-dimensional reconstruction of a to-be-scanned object, creating a three-dimensional model of the actual object. The reconstructed three-dimensional model can be widely used in industrial design, reverse engineering, medical materials, bioinformatics, digital artifact collections, game creation and other fields.

An automated three-dimensional scanning system uses a mechanical arm to grip a scanner to acquire related data of a to-be-measured object (or workpiece) in real time. In order to adapt to objects with different sizes and shapes, a position of a rotary table for carrying the objects relative to the mechanical arm may change, so motion paths (scanning paths) of the mechanical arm and the scanner need to be adjusted accordingly. In particular, after the position of the rotary table is changed for measuring different objects, if an object of the same type needs to be measured, the rotary table may not return to the same position as that in the previous measurement, which makes a previous scanning path unusable and requires reconfiguration and adjustment of a new scanning path.

SUMMARY

An objective of the present application is to provide a solution to improve existing three-dimensional scanning technology.

In one aspect, a three-dimensional scanning system is provided. The system includes:
  a control apparatus configured to determine a planned scanning path for a to-be-measured object based on a historical scanning path of an object type to which the current to-be-measured object belongs and according to a historical pose and a current pose of a rotary table carrying the to-be-measured object, wherein a pose refers to position and orientation; and
  a mechanical arm including a gripping end for gripping a scanner to drive the scanner to scan the to-be-measured object according to the planned scanning path under control of the control apparatus.

Advantageously, the current pose is a pose of the same rotary table adjusted based on the historical pose to adapt to the to-be-measured object.

Advantageously, the three-dimensional scanning system further includes: a plurality of rotary tables, wherein each of the rotary tables is used for carrying an object of a preset object type.

Advantageously, the current pose is a pose of a rotary table selected from the plurality of rotary tables for carrying the current to-be-measured object.

Advantageously, the object type is determined according to identity information and/or a model file of the to-be-measured object.

Advantageously, the three-dimensional scanning system further includes: a tracking apparatus configured to track markers disposed on the rotary table to obtain the current pose of the rotary table.

Advantageously, the control apparatus is further configured to: carry out security verification on the planned scanning path to simulate whether a collision with other objects or a mechanical arm body occurs during operation according to the planned scanning path through the mechanical arm, and determine whether to revise the planned scanning path.

Advantageously, the control apparatus is further configured to carry out effect verification on the planned scanning path to simulate acquisition of a three-dimensional model according to a preset position and speed of operation of the rotary table and the planned scanning path of the mechanical arm, and determine whether to revise the position and speed of operation of the rotary table and the planned scanning path.

In another aspect, a scanning path planning method of a three-dimensional scanning system is provided. The method includes:
  acquiring a historical scanning path of an object type to which a to-be-measured object belongs;
  acquiring a historical pose of a rotary table for carrying the to-be-measured object;
  acquiring a current pose of the rotary table; and
  determining a planned scanning path of the to-be-measured object based on the historical scanning path and according to the historical pose and the current pose of the rotary table.

In yet another aspect, a three-dimensional scanning method is provided. The method includes:
  acquiring registration information of a to-be-measured object;
  determining, according to the registration information, whether to configure a scanning path or adjust a historical scanning path, so as to generate a planned scanning path; and
  controlling, according to the planned scanning path, a scanner to scan a surface of the object, and generating three-dimensional data of the surface of the object.

Advantageously, the adjusting a historical scanning path includes, based on determining that the registration information of the to-be-measured object is found in a database:
  acquiring a historical scanning path of an object type to which the to-be-measured object belongs;
  acquiring a historical pose of a rotary table for carrying the to-be-measured object;
  acquiring a current pose of the rotary table; and
  determining a planned scanning path of the to-be-measured object based on the historical scanning path and according to the historical pose and the current pose of the rotary table.

Advantageously, the current pose is a pose of the same rotary table adjusted based on the historical pose to adapt to the to-be-measured object.

Advantageously, the current pose is a pose of a rotary table selected from a plurality of rotary tables for carrying the to-be-measured object, wherein each of the plurality of rotary tables is used for carrying a to-be-measured object of a preset object type.

Advantageously, the configuring a scanning path includes, based on determining that the registration information of the to-be-measured object is not found in a database of a control apparatus: acquiring a pose of a rotary table carrying the to-be-measured object; and generating the scanning path.

Embodiments of the present application can complete measurement of objects with different sizes and shapes under the same set of hardware conditions based on a three-dimensional scanning test environment with changing relative positions of the rotary table and the mechanical arm. In particular, for the same type of workpieces, the planned scanning path is obtained by adjusting the historical scanning path, thus effectively improving the scanning efficiency, security and accuracy. In addition, as embodiments of the present application adopt a solution of a plurality of rotary tables, a measurement process of a subsequent object may be performed immediately after a measurement process of a previous object is completed, which effectively improves the efficiency of automated measurement.

Other details and advantages of the present application will be further described in the following accompanying drawings and description.

BRIEF DESCRIPTION OF DRAWINGS

Some specific embodiments of the present application will be described in detail below in an exemplary and non-limiting manner with reference to the accompanying drawings. The same reference numerals in the accompanying drawings indicate the same or similar components or parts.

DETAILED DESCRIPTION

Unless otherwise defined, technical or scientific terms as used in the present application shall have the ordinary meaning understood by a person of ordinary skill in the art to which the present application pertains. The terms "comprise", "include", "have" and any variations thereof, as used in the present application, are intended to cover non-exclusive inclusion. For example, processes, methods, systems, products, or devices including a series of steps or modules (units) are not limited to the listed steps or modules (units), but may include steps or modules (units) that are not listed or may include other steps or modules (units) that are inherent to the processes, methods, products, or devices. The terms "connecting", "connected", "coupled" and the like as used in the present application are not limited to physical or mechanical connections, but may include electrical, wired, wireless and other means of connection, whether it is direct or indirect connection. The term "a plurality of" as used in the present application means two or more. "And/or" describes an association relationship of associated objects, which means that three relationships may exist. For example, "A and/or B" may mean three cases: A alone, A and B at the same time, and B alone. The character "/" generally indicates that associated objects are in an "or" relationship. The terms "first", "second", "third", etc., as used in the present application, are only to distinguish similar objects and do not represent a specific ordering of the objects.

Figure 1:
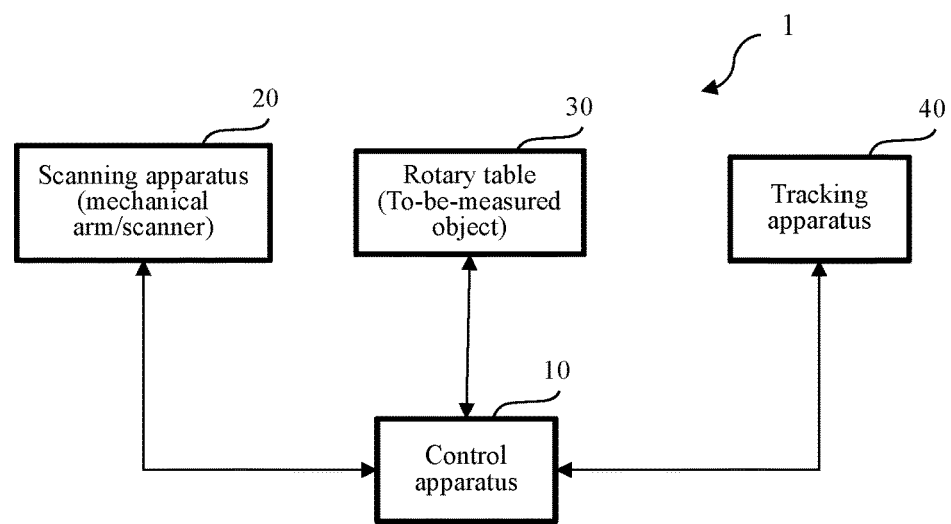
FIG. 1 shows a block diagram of a three-dimensional scanning system according to one or more embodiments.

FIG. 1 shows a block diagram of a three-dimensional scanning system 1 according to one or more embodiments. The three-dimensional scanning system includes a control apparatus 10, a scanning apparatus 20 (including a mechanical arm and a scanner fixed to the mechanical arm), a rotary table 30 for carrying a to-be-measured object, and a tracking apparatus 40.

The rotary table 30 is used for carrying the to-be-measured object. In one or more embodiments, a carrier plate for placing the measured object is disposed on a top surface of the rotary table, a rotation motor and a control box are disposed inside the rotary table, and a spindle of the rotation motor is fixedly connected to a bottom surface of the carrier plate. During operation of the rotation motor, the spindle of the rotation motor starts to rotate to drive the carrier plate to rotate, so that the object fixed on the carrier plate rotates, causing the scanning apparatus to scan the object.

According to one or more embodiments of the present application, one rotary table may be included. The rotary table may be used for carrying different to-be-measured objects. Moreover, a position of the rotary table is adjusted accordingly for different to-be-measured objects, so as to, for example, obtain a desirable scanning effect when coordinate systems of a mechanical arm body of the scanning apparatus and a tracker of the tracking apparatus relative to a place of measurement do not change.

According to another embodiment of the scanning system of the present application, a plurality of rotary tables may be included. Each of the plurality of rotary tables is used for carrying a to-be-measured object of a preset object type, so that a corresponding rotary table needs to be selected according to specific conditions of a to-be-measured object in a measurement. The object type is determined, for example, according to identity information and/or a model file of the to-be-measured object.

The scanning apparatus 20 includes the mechanical arm and the scanner fixed to an end of the mechanical arm. The scanner has a scanning function and is used for scanning the measured object. The scanner includes, for example, a binocular camera, a laser, a light source, and a marking structure.

The scanning apparatus 20 scans the to-be-measured object according to a planned scanning path under the control of the control apparatus 10. The planned motion path of the mechanical arm is specifically a planned motion path of the end of the mechanical arm. Since the scanner is provided at the end of the mechanical arm, the motion path of the end of the mechanical arm may be equivalent to a scanning path of the scanner. The planned motion path of the mechanical arm may be acquired by way of teaching. Specifically, the motion of the end of the mechanical arm is controlled by means of a manual teaching, so that the planned motion path of the mechanical arm, that is, an approximate scanning path of the scanner, is determined. The planned motion path may be determined by firstly determining planned motion path points, which may specifically be pose information of the end of the mechanical arm, and then fitting the planned motion path points to the planned motion path. In addition, the planned motion path may also be input directly into a teaching of the mechanical arm by way of teaching. Alternatively, the system is controlled to automatically generate the planned scanning path, as will be further described below.

The mechanical arm may be a multi-degree-of-freedom mechanical arm. For example, the mechanical arm may be a six-degree-of-freedom mechanical arm, which is capable of flexibly controlling a movement position and attitude of an object fixed to the mechanical arm. The mechanical arm may be fixed to a base. For example, a mechanical arm coordinate system is divided into a mechanical arm base coordinate system and a mechanical arm gripper coordinate system. The mechanical arm base coordinate system, for example, is established by taking an intersection of the base and an axis of a bottom end of the mechanical arm as an origin of the coordinate system. The mechanical arm gripper coordinate system is established by taking an intersection of the scanner and an axis of an end of the mechanical arm as an origin of the coordinate system. If the scanner is mounted at the end of the mechanical arm by means of a connector (e.g., a mounting member), the mechanical arm gripper coordinate system may be established by taking an intersection of a mounting member and the axis of the end of the mechanical arm as the origin of the coordinate system. The mounting member may be a flange, etc. A pose transformation relationship of the mechanical arm gripper coordinate system relative to the mechanical arm base coordinate system may be obtained by prior registration, or by other ways.

The mechanical arm and the scanner are both in communication with the control apparatus 10. During scanning, a motion path of the mechanical arm is a scanning path. The control apparatus 10 acquires data of coded markers within a scanning area captured by a camera and a current planned scanning path in real time during the scanning, to determine whether the scanning apparatus 20 needs obstacle avoidance. Furthermore, in the event of the determination of the need for obstacle avoidance, a following scanning path of the three-dimensional scanning system is adjusted according to a preset path adjustment strategy, thus achieving real-time accurate obstacle avoidance.

An attitude sensor for measuring real-time attitude data of the mechanical arm may be disposed on the mechanical arm, and the attitude sensor is in communication with the control apparatus. The attitude sensor may send the real-time attitude data of the mechanical arm detected by the attitude sensor to the control apparatus. The control apparatus processes the attitude data and performs simulation to obtain real-time action image information of the mechanical arm. The control apparatus sends the real-time action image information to a central chip through a communication module. The central chip receives the real-time action image information and transmits the same to a display module to be displayed on the display module for easy reading by a user. During specific use by the user, the user uses a peripheral device to program a mechanical arm operation program to the central chip, the central chip transmits the operation program to a processor through the communication module, the processor gives an operation instruction to the mechanical arm according to the operation program, and the mechanical arm starts to operate according to the received working instruction. In this case, the attitude sensor detects a real-time action attitude of the mechanical arm and sends the detected real-time attitude data of the mechanical arm to the processor, the processor obtains the real-time action image information of the mechanical arm after processing the attitude data and performing simulation, and the processor transmits the real-time action image information to the central chip through the communication module. The central chip may integrate the real-time action image information with mechanical arm operation program codes, so that the mechanical arm operation program codes have a one-to-one correspondence to the real-time action image information of the mechanical arm, and are displayed on the display module. When the user identifies a problem with an operation step of the mechanical arm, the user may find the mechanical arm operation program codes corresponding to the operation step of the mechanical arm from the display module, so as to identify the problem, which facilitates use by the user.

The tracking apparatus 40 may, for example, include a binocular tracker for use during scanning of the scanning apparatus 20 on the measured object in order to obtain pose information of the scanning apparatus 20 in an operating state. In this case, the tracking apparatus 40 is kept at a fixed position during operation. Alternatively, the tracking apparatus 40 may also move, in which case a coordinate system needs to be unified by a positioning device or background markers.

In another embodiment, the tracking apparatus 40 may, for example, include two or more trackers. The specific selection of the number of trackers is determined according to the characteristics, such as the size and shape, of the measured object. Specifically, for example, the tracking apparatus 40 includes a first tracker, a second tracker, and a positioning device. The first tracker and the second tracker are provided with binocular cameras, and the first tracker and the second tracker are respectively used for tracking the pose information of the scanning apparatus 20 within respective tracking ranges. The positioning device is used for constructing a unified coordinate system for the first tracker and the second tracker to achieve unification of data coordinates. Alternatively, the unified coordinate system may also be constructed by other ways, for example, by means of background markers.

In yet another embodiment, the first tracker and the second tracker included in the tracking apparatus 40 may be provided with monocular cameras. The first tracker and the second tracker may be combined for use as binocular tracking, or may be separated from each other to acquire a pose of the scanning apparatus 20 based on a principle of monocular tracking. Alternatively, the first tracker and/or the second tracker may be disposed in a movable mechanical structure, and may be driven by the mechanical structure to move to track the pose of the scanning apparatus 20.

Further, the second tracker may be provided with an identification structure correspondingly, or relative positions of the second tracker and a corresponding identification structure are fixed. An asymmetric pattern may be provided on the identification structure corresponding to the second tracker as a first positioning identifier. The asymmetric pattern includes, but is not limited to, dots, lines, and other forms. The positioning device obtains a pose of the second tracker relative to the positioning device by tracking the first positioning identifier on the second tracker.

Similarly, an identification structure may also be provided on the scanning apparatus 20, and a positioning pattern provided on the identification structure may serve as a second positioning identifier so as to facilitate tracking of the scanning apparatus 20 by the first tracker and the second tracker, respectively, based on the second positioning identifier. The identification structure may be provided on the scanning apparatus 20 or may be connected to the scanning apparatus 20 via a rigid structure. For example, the identification structure may be rigidly connected to the scanning apparatus 20 through a scanning apparatus framework.

During scanning, the scanning apparatus 20 acquires three-dimensional data of the measured object under a scanning apparatus coordinate system by moving to different scanning positions. The scanning apparatus coordinate systems corresponding to different scanning positions are different, and scanning apparatus coordinate systems corresponding to different scanning positions are local coordinate systems. The first tracker may track the scanning apparatus. Specifically, the first tracker may track the scanning apparatus based on the second positioning identifier of the scanning apparatus within an operation field of view of the first tracker, so as to acquire the pose information of the scanning apparatus. Similarly, when the scanning apparatus moves to a tracking field of view of the second tracker, the second tracker tracks the scanning apparatus based on the second positioning identifier of the scanning apparatus. The tracking range is extended by using the first tracker and the second tracker simultaneously.

The control apparatus 10 may be a server, a personal computer, or other apparatuses used for controlling the tracking apparatus and the scanning apparatus. The control apparatus 10 is in communication with the scanning apparatus 20, the rotary table 30, the tracking apparatus 40 and other related apparatuses to acquire, process and transmit related information and instructions. For example, the control apparatus 10 may transmit rotation control information about the rotary table 30, control, based on the rotation control information, the rotary table to rotate in a motion direction of the scanning apparatus 20 and according to a preset rotation strategy, and drive the tracking apparatus 40 to move to a specified tracking pose.

Figure 2:
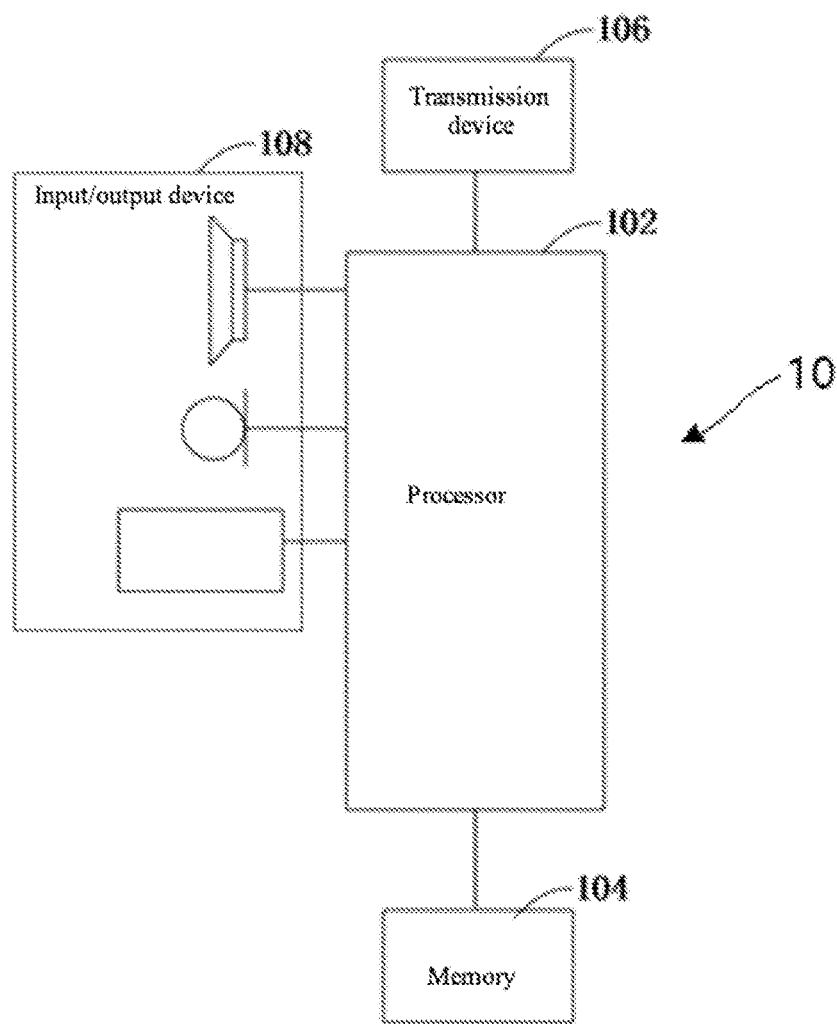
FIG. 2 shows a block diagram of a control apparatus according to one or more embodiments.

FIG. 2 is a structural block diagram of the control apparatus 10 according to one or more embodiments. The control apparatus may include one or more (only one is shown in FIG. 1) processors 102 and a memory 104 for storing data. The processor 102 may include, but are not limited to, processing apparatuses such as a microprocessor unit (MCU) or a field-programmable gate array (FPGA). The control apparatus may further include a transmission device 106 for communication functions and an input/output device 108. It may be understood by a person of ordinary skill in the art that the structure shown in FIG. 2 is merely illustrative, and does not limit the structure described above. For example, the control apparatus may further include more or fewer components than shown in FIG. 2, or have a different configuration compared to that illustrated in FIG. 2.

The memory 104 may be configured to store a computer program, for example, a software program and modules of an application software, such as a computer program corresponding to a scanning path planning method of the three-dimensional scanning system in one or more embodiments. The processor 102 performs various functional applications as well as data processing, i.e., achieves related method steps of one or more embodiments of the present application, by running the computer program stored in the memory 104. The memory 104 may include a high-speed random memory, and may also include a non-volatile memory, such as one or more magnetic storage apparatuses, a flash memory, or other non-volatile solid-state memories. In some examples, the memory 104 may further include memories set remotely relative to the processor 102, and these remote memories may be connected to a terminal via a network. Examples of the network include, but are not limited to, the Internet, corporate intranets, local area networks, mobile communication networks, and combinations thereof.

The transmission device 106 is configured to receive or transmit data via a network. The network includes a wireless network provided by a communication provider of the terminal. In one example, the transmission device 106 includes a network interface controller (NIC) that may be connected to other network devices via a base station and thus may communicate with the Internet. In one example, the transmission device 106 may be a radio frequency (RF) module for communicating wirelessly with the Internet.

Figure 3A:
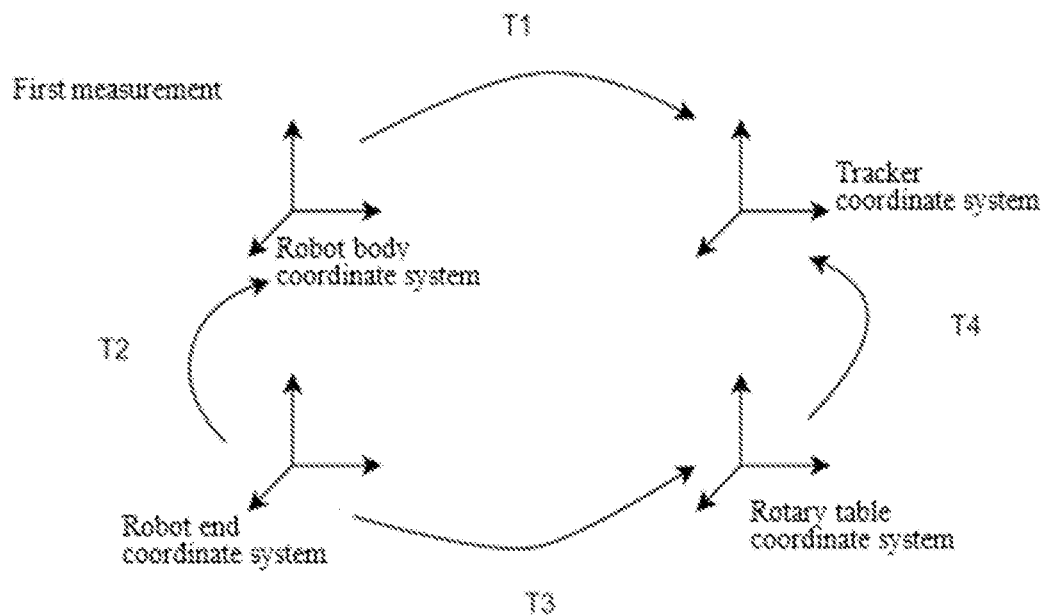
FIG. 3A and FIG. 3B show a transformation relationship between coordinates of related apparatuses in two measurements during scanning according to one or more embodiments.
Figure 3B:
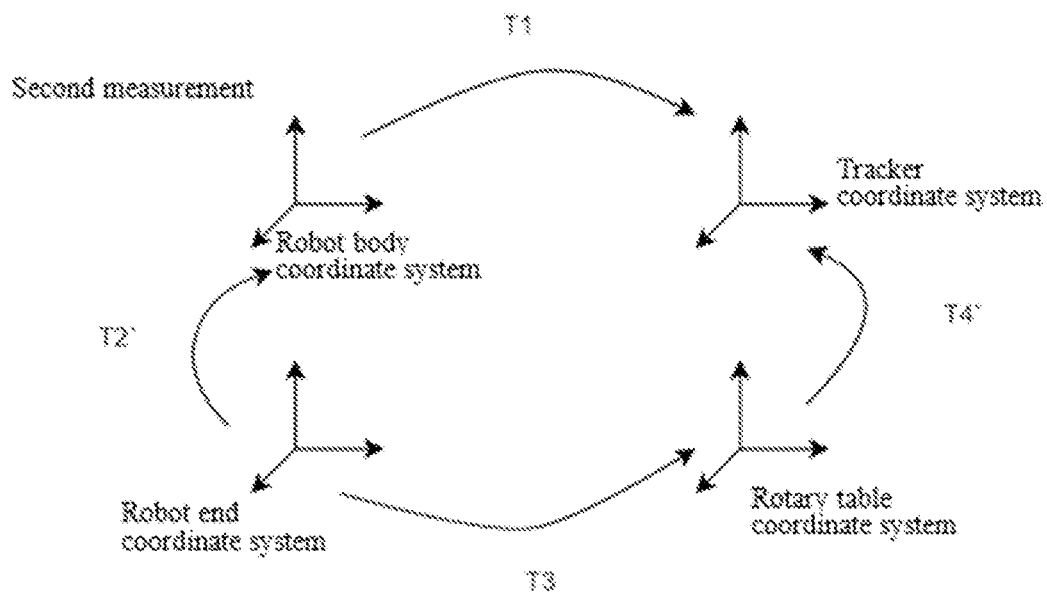

FIG. 3A and FIG. 3B show a transformation relationship between coordinates of related components in two different measurements when the scanning system according to one or more embodiments of the present application is used for scanning. It is to be noted that according to the scanning system of one or more embodiments, the tracker of the tracking apparatus and the mechanical arm body of the scanning apparatus may have fixed coordinate systems with respect to a place of measurement, but the position of the rotary table may change in different measurements or different rotary tables may be selected in the case of a plurality of rotary tables.

For example, in a first measurement, a specific rotary table is used to carry a first to-be-measured object, and the rotary table has a first fixing position. In a second measurement, the same rotary table is used to carry a second to-be-measured object, and the rotary table may need to be fixed to a second fixing position different from the first measurement due to a size, type, etc. of the second to-be-measured object.

For another example, in the first measurement, a first rotary table is used to carry the first to-be-measured object, and the rotary table has the first fixing position. In the second measurement, a second rotary table may need to be selected from a plurality of rotary tables due to the size, type, etc. of the to-be-measured object, and thus the second rotary table may have a second fixing position different from the first measurement.

For yet another example, in the first measurement, the first rotary table is used to carry the first to-be-measured object, and the rotary table has the first fixing position. In the second measurement, although the same rotary table is selected from the plurality of rotary tables, a fixing position of the second rotary table may change, and the second rotary table has a second fixing position different from the first measurement.

Referring to FIG. 3A, in the first measurement, a pose of the mechanical arm body (or a robot body) relative to a tracking apparatus (for example, a tracker) coordinate system is T1, a pose of a mechanical arm end (or a robot end) relative to a mechanical arm body coordinate system is T2, a pose of the mechanical arm end relative to a rotary table coordinate system is T3, and a pose of the rotary table relative to the tracking apparatus coordinate system is T4. Because $T3*T4=T2*T1$, $T4=T3\char`\^(-1)*T2*T1$ and $T3=T2*T1*T4\char`\^(-1)$.

Referring next to FIG. 3B, in the second measurement, the pose of the mechanical arm body relative to the tracking apparatus coordinate system is maintained as T1; the pose of the mechanical arm end relative to the mechanical arm body coordinate system needs to be adjusted to be T2' according to the planned scanning path; and the pose of the rotary table relative to the tracker coordinate system is adjusted to be T4'. Because $T2'=T3*T4'*T1\char`\^(-1)$, by combining with the formula $T3=T2*T1*T4\char`\^(-1)$ in the first measurement, $T2'=T2*T1*T4\char`\^(-1)*T4'*T1\char`\^(-1)$ may be obtained. Therefore, the scanning path for the second measurement may be obtained by adjusting the scanning path for the first measurement according to this formula.

To this end, the control apparatus in the three-dimensional scanning system according to one or more embodiments of the present application may be set to determine the planned scanning path of the to-be-measured object based on the historical scanning path of the object type to which the to-be-measured object belongs and according to a historical pose and a current pose of the rotary table carrying the to-be-measured object. Thus, the mechanical arm drives the scanner to scan the to-be-measured object according to the planned scanning path under the control of the control apparatus.

The scanning path is planned for each measurement according to the object type of the to-be-measured object, where the object type is determined, for example, according to the identity information and/or a model file of the to-be-measured object.

The historical scanning path is a scanning path implemented by an object of the type of the to-be-measured object in a previous measurement.

The planned scanning path is a scanning path planned and implemented for the current to-be-measured object.

The historical pose is, for example, a position of the rotary table for the current to-be-measured object in a previous (for example, a last) measurement, where the rotary table may be a single rotary table disposed in the system, or the same rotary table repeatedly selected from a plurality of rotary tables. Alternatively, in the case that the scanning system is provided with a plurality of rotary tables, the current pose is a pose of a rotary table selected from the plurality of rotary tables suitable for the type of the to-be-measured object in a previous measurement for the same type of object.

The current pose is, for example, a position of the same rotary table adjusted based on the historical pose to adapt to the to-be-measured object, where the same rotary table may be a single rotary table disposed in the system, or may be the same rotary table repeatedly selected from the plurality of rotary tables. Alternatively, in the case that the scanning system is provided with a plurality of rotary tables, the current pose is a pose of a rotary table selected from the plurality of rotary tables suitable for the type of the to-be-measured object in a current measurement.

Embodiments of the present application can complete measurement of objects with different sizes and shapes under the same set of hardware conditions based on a three-dimensional scanning test environment with changing relative positions of the rotary table and the mechanical arm. In particular, for the same type of workpieces, the planned scanning path is obtained by adjusting the historical scanning path, thus effectively improving the scanning efficiency, security and accuracy. In addition, as embodiments of the present application adopt a solution of a plurality of rotary tables, a measurement process of a subsequent object may be performed immediately after a measurement process of a previous object is completed, which effectively improves the efficiency of automated measurement.

Figure 4:
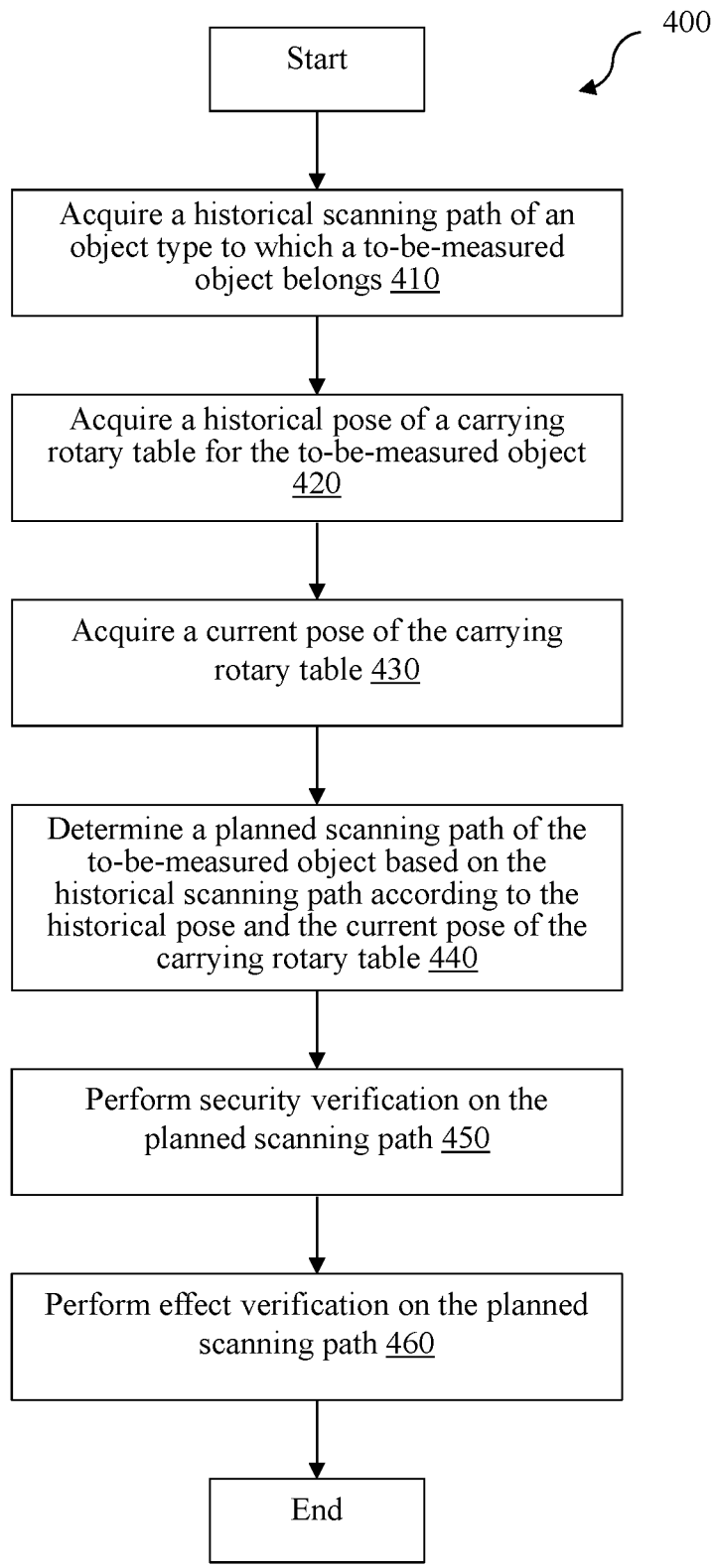
FIG. 4 shows a scanning path planning method according to one or more embodiments of the present application.

FIG. 4 shows a scanning path planning method 400 of a three-dimensional scanning system according to one or more embodiments of the present application. The method includes the following steps:

In Step 410, a historical scanning path of an object type to which a to-be-measured object belongs is acquired.

For example, types of various to-be-measured objects are determined in advance according to identity information and/or model files of the to-be-measured objects. In the case that a plurality of rotary tables are provided, different rotary tables are preset to carry different types of objects to obtain the optimal measurement effect. Therefore, historical measurement data may be stored according to object types and suitable rotary tables, and a corresponding suitable rotary table and historical measurement data, including historical scanning paths, are acquired in a later measurement according to an object type of a to-be-measured object.

In Step 420, a historical pose of a carrying rotary table for the to-be-measured object is acquired.

As indicated above, the historical measurement data may be stored according to the object types and the suitable rotary tables. The historical measurement data includes serial numbers and configured poses of the rotary tables, and is obtained as the historical pose in the later measurement according to the object type of the to-be-measured object.

In Step 430, a current pose of the carrying rotary table is acquired.

When the to-be-measured object is scanned, a suitable rotary table needs to be selected according to the object type, and rearrangement is performed according to specific conditions, such as a size and a shape of the object. In this case, the rotary table has a pose different from that in the historical measurement, where the pose may be obtained as the current pose by tracking markers on the rotary table. The current pose is, for example, a pose of the same rotary table adjusted based on the historical pose to adapt to the to-be-measured object. Alternatively, the current pose is, for example, a pose of a rotary table selected from a plurality of rotary tables for carrying the to-be-measured object, where each of the plurality of rotary tables is used for carrying a to-be-measured object of a preset object type.

In Step 440, a planned scanning path of the to-be-measured object is determined based on the historical scanning path and according to the historical pose and the current pose of the carrying rotary table.

For example, as described in FIGS. 3A and 3B above, in a first measurement, a pose of a mechanical arm body (or a robot body) relative to a tracking apparatus (for example, a tracker) coordinate system is T1, a pose of a mechanical arm end (or a robot end) relative to a mechanical arm body coordinate system is T2, a pose of the mechanical arm end relative to a rotary table coordinate system is T3, and a pose of the rotary table relative to the tracking apparatus coordinate system is T4. Because T3*T4=T2*T1, T4=T3^(−1)*T2*T1, and T3=T2*T1*T4^(−1). In a second measurement, the pose of the mechanical arm body relative to the tracking apparatus coordinate system is maintained as T1, the pose of the mechanical arm end relative to the mechanical arm body coordinate system needs to be adjusted to be T2' according to the planned scanning path, and the pose of the rotary table relative to the tracker coordinate system is adjusted to be T4'. Because T2'=T3*T4'*T1^(−1), by combining with the formula T3=T2*T1*T4^(−1) in the first measurement, T2'=T2*T1*T4^(−1)*T4'*T1^(−1) may be obtained. Therefore, the scanning path for the second measurement may be obtained by adjusting the scanning path for the first measurement according to this formula.

The scanning path planning method according to one or more embodiments of the present application may further include Step 450 where security verification on the planned scanning path is performed.

For example, whether a collision with other objects or the mechanical arm body may occur on an operation path during operation according to the planned scanning path through the mechanical arm is simulated, and whether to revise the scanning path is determined.

The scanning path planning method according to the present application may further include Step 460 where effect verification on the planned scanning path is performed.

For example, by simulating and generating a point cloud according to the preset position and operation speed of the rotary table and the planned scanning path of the mechanical arm, whether a three-dimensional model can finally be acquired is determined, and whether the speed of the rotary table and the scanning path need to be revised is determined.

Figure 5:
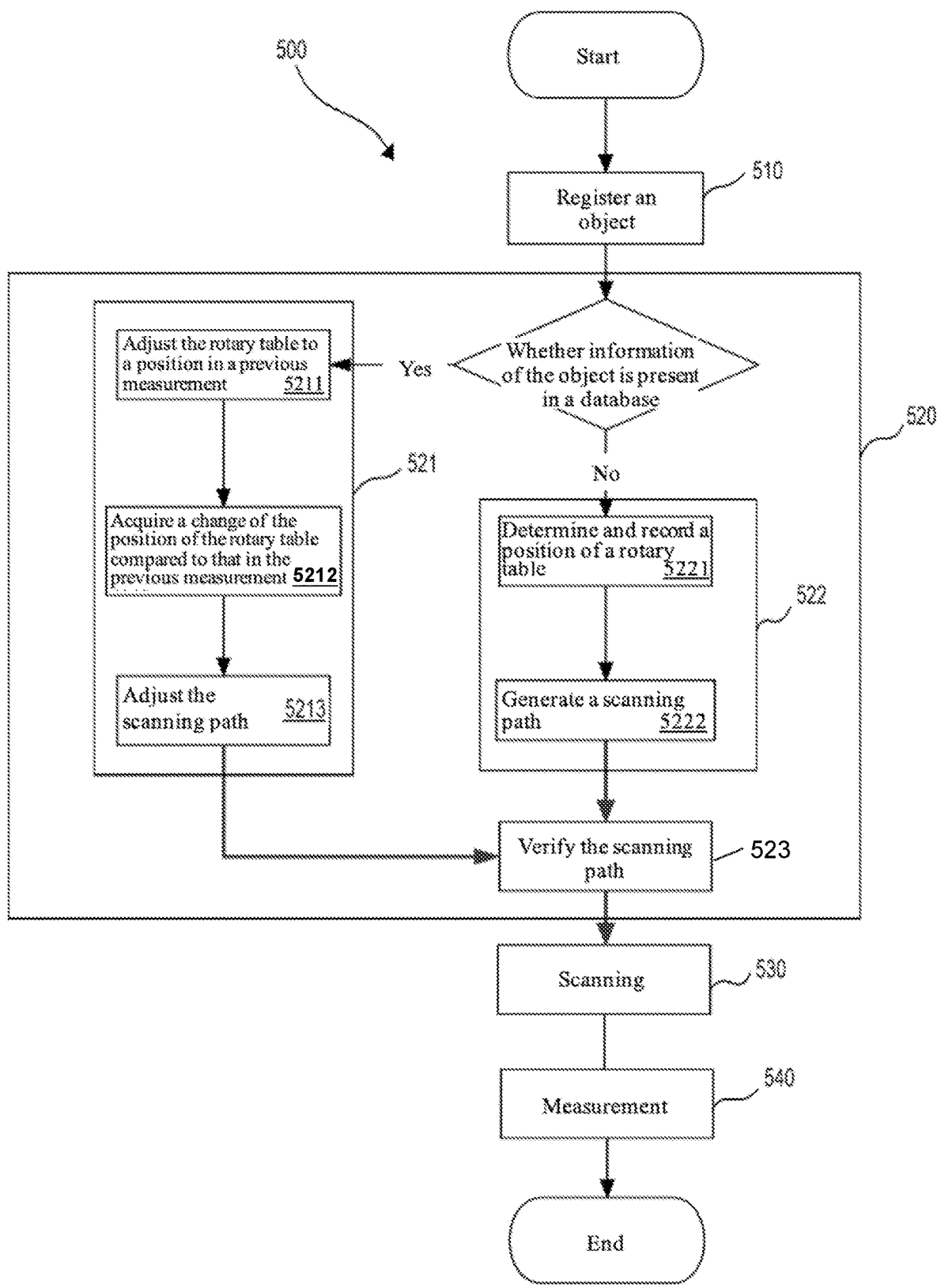
FIG. 5 shows a three-dimensional scanning method according to one or more embodiments of the present application.

FIG. 5 shows a three-dimensional scanning method 500 according to one or more embodiments of the present application.

The method 500 includes Step 510 where an object is registered.

For example, information of the object input into a control apparatus is acquired, where the information of the object includes, for example, object ID information and a model file of the object.

The method 500 further includes Step 520 where a scanning path is planned.

If the information of the object is not found in a database of the control apparatus, it indicates that the object needs to proceed to Step 521 where a measurement process is configured, including: Substep 5221 where a position of a rotary table is determined and recorded; and Substep 5222 where a scanning path is generated.

The scanning path includes, for example, a motion path of the mechanical arm, a motion path of the rotary table, a sequence of measurements, etc. For example, the scanning path may be generated automatically or through a teaching method. The scanning path may include target point position information of the mechanical arm, target point position information of the rotary table, a control instruction of a tracking apparatus, a control instruction of a scanner, etc. The mechanical arm drives a scanner to move, and a scanning path of the scanner may be calculated by pose conversion after the motion path of the mechanical arm is determined. A rotation speed of the rotary table includes a rotation speed for carrying a to-be-measured object. During rotation of the rotary table, the rotation speed of the rotary table needs to match the scanning path of the scanner to obtain an ideal scanning effect.

If the information of the object is found in the database of the system, it indicates that the object has been measured before, and a measurement process (including a historical scanning path, a historical pose of the rotary table, etc.) for the type of objects is present in the database. Therefore, Step 522, that is, adjusting the scanning path is performed. In one or more embodiments, the step of adjusting the scanning path includes:

Substep 5211 where the rotary table is adjusted to a position in a previous measurement;
Substep 5212 where a change of the position of the rotary table compared to that in the previous measurement is acquired; and
Substep 5213 where the scanning path is adjusted.

Substep 5212, for example, includes acquiring a historical scanning path of an object type to which a to-be-measured object belongs. For example, types of various to-be-measured objects are determined in advance according to identity information and/or model files of the to-be-measured objects. In the case that a plurality of rotary tables are provided, different rotary tables are preset to carry different types of objects to obtain the optimal measurement effect. Therefore, historical measurement data may be stored according to object types and suitable rotary tables, and a corresponding suitable rotary table and historical measurement data, including historical scanning paths, are acquired in a later measurement according to an object type of a to-be-measured object.

Substep 5212, for example, further includes acquiring a historical pose of a carrying rotary table for the to-be-measured object. As indicated above, the historical measurement data may be stored according to the object types and the suitable rotary tables, and the historical measurement data includes serial numbers and configured poses of the rotary tables, and is obtained as the historical pose in the later measurement according to the object type of the to-be-measured object.

Substep 5212, for example, further includes acquiring a current pose of the carrying rotary table. When the to-be-measured object is scanned, a suitable rotary table needs to be selected according to the object type, and a position is rearranged according to specific conditions, such as a size and a shape, of the object. In this case, the rotary table has a pose different from that in the previous measurement, where the pose may be obtained as the current pose by tracking markers on the rotary table. The current pose is a pose of the same rotary table adjusted based on the historical pose to adapt to the to-be-measured object. Alternatively, the current pose is a pose of a rotary table selected from a plurality of rotary tables for carrying the to-be-measured object, where each of the plurality of rotary tables is used for carrying a to-be-measured object of a preset object type.

Substep 5213, for example, includes determining a planned scanning path of the to-be-measured object based on the historical scanning path and according to the historical pose and the current pose of the carrying rotary table.

Step 520, that is, planning the scanning path, may further include Step 523 where the scanning path is verified.

For example, security verification is performed on the scanning path generated in Step 522 or the scanning path adjusted in Step 521 again. Whether a collision with other objects or a mechanical arm body may occur on an operation path during operation according to the planned scanning path through the mechanical arm is simulated, and whether to revise the path is determined. For another example, effect verification is performed on the scanning path generated in Step 522 or the scanning path adjusted in Step 521 again. By simulating and generating a point cloud according to the preset position and operation speed of the rotary table and the planned scanning path of the mechanical arm, whether a three-dimensional model can finally be acquired is determined, and whether the speed of the rotary table and the planned scanning path need to be revised is determined.

The method 500 further includes Step 530 where the to-be-measured object is scanned.

In one or more embodiments, the rotary table drives the object to rotate at a set rotation speed under the control instruction of the control apparatus, and meanwhile reconstructs three-dimensional data of the surface of the object through cooperation of the tracking apparatus and the scanning apparatus. The tracking apparatus is fixed to a certain position to provide a fixed global coordinate system for scanning of the object. When the scanning apparatus scans the surface of the object, based on a position of the scanning apparatus at each moment relative to the tracking apparatus, scanning data acquired by the scanning apparatus at different times may be converted to a tracking apparatus coordinate system at the position, so as to achieve stitching of the object under the global coordinate system. The scanned surface refers to a surface of a scanned object within a scanning range of a scanner when the mechanical arm reaches a current motion path point. When the mechanical arm reaches the current motion path point, the scanner attached to the end of the mechanical arm acquires point cloud data from the scanned surface. The point cloud data is used for describing points on the scanned surface, which may specifically be three-dimensional coordinates and normal data of each position on the scanned surface. It can be understood that the point cloud data on the scanned surface acquired by the scanner may be different when the mechanical arm is at different motion path points. Since the scanned surface is not necessarily a plane, when the mechanical arm reaches the current motion path point, distances between all points on the scanned surface and the scanner may not be equal. Therefore, in order to control the distance between a motion path point of the mechanical arm and the scanned surface, modified parameters corresponding to the motion path point may be obtained through certain statistical processing of the point cloud data acquired from the motion path point.

The method 500 further includes Step 540 where a generated point cloud is measured.

In one or more embodiments, after Step 530 is performed, surface information data of the to-be-measured object is acquired, and the size and other information of concern are obtained from the obtained data through point cloud fitting, extraction and other methods.

It is to be noted that part or all of the steps illustrated in the above process or the accompanying drawings may be performed in a computer system such as a set of computer-executable instructions, and that, although a logical sequence is illustrated in the flow diagram, in some instances, the steps shown or described may be performed in an order different from that shown herein.

One or more embodiments further provide a path planning apparatus of a three-dimensional scanning system. The apparatus is configured to implement the above embodiments and preferred implementations. The terms "module", "unit", "subunit", etc. used below may be a combination of software and/or hardware that achieves a preset function. Although the apparatus described in the following embodiments is preferably implemented in software, implementations in hardware, or a combination of software and hardware, are also possible and conceived.

One or more embodiments further provide a computer device. The computer device includes a memory having a computer program stored therein and a processor configured to run the computer program to perform the steps in any one of the method embodiments above.

For example, the above processor may be configured to perform the following related steps for determining a planned scanning path through the computer program:

Step 410 where a historical scanning path of an object type to which a to-be-measured object belongs is acquired;

Step 420 where a historical pose of a carrying rotary table for the to-be-measured object is acquired;

Step 430 where a current pose of the carrying rotary table is acquired;

Step 440 where a planned scanning path of the to-be-measured object is determined based on the historical scanning path and according to the historical pose and the current pose of the carrying rotary table;

Step 450 where security verification on the planned scanning path is performed; and Step 460 where effect verification on the planned scanning path is performed.

For another example, the processor may be configured to perform the following related steps of the three-dimensional scanning method through the computer program:

In Step 510, an object is registered. For example, information of the to-be-measured object input into a control apparatus is acquired, where the information of the object includes, for example, ID information of the object and a model file of the object.

In Step 520, a scanning path is planned, including Step 522 where a measurement process is configured, which further includes: Substep 5221 where a position of a rotary table is determined and recorded; and Substep 5222 where a scanning path is generated. Step 520 further includes Step 521 where the scanning path is adjusted, which further includes: Substep 5211 where the rotary table is adjusted to a position in a previous measurement; Substep 5212 where a change of the position of the rotary table compared to that in the previous measurement is acquired; and Substep 5213 where the scanning path is adjusted.

In Step 530, the to-be-measured object is scanned.

It is to be noted that specific examples in this embodiment may correspond to the examples described in the above embodiments and optional implementations, and will not be repeated in this embodiment.

In addition, in conjunction with the scanning path planning method of the three-dimensional scanning system according to the above embodiments, a storage medium may also be provided in this embodiment to achieve the same. The storage medium has a computer program stored therein. The computer program, when executed by a processor, implements any one of the path planning methods of the three-dimensional scanning system in the embodiments described above.

It should be understood that the specific embodiments described herein are for explanation only and are not intended to limit specific solutions. According to the embodiments of the present application, all other embodiments derived by a person of ordinary skill in the art without creative effort fall within the scope of protection of the present application.

Apparently, the accompanying drawings are only some examples or embodiments of the present application, and a person of ordinary skill in the art may also apply the present application to other similar situations based on the drawings without creative effort.

The term "embodiment(s)" in the present application means that specific features, structures or characteristics described in conjunction with the embodiments may be included in at least one of the embodiments of the present application. The presence of this phrase at various locations in the specification does not necessarily imply the same embodiments, nor does it imply independence or alternative embodiments to other embodiments that are mutually exclusive. It will be clearly or implicitly understood by those of ordinary skill in the art that the embodiments described in the present application may be combined with other embodiments without conflict.

The above-described embodiments express only several implementations of the present application, which are described in a specific and detailed manner, but are not to be construed as a limitation of the scope of patent protection. It should be pointed out that, for a person of ordinary skill in the art, other modifications and improvements may be made without departing from the conception of the present application, all of which fall within the scope of protection of the present application. Therefore, the scope of protection of the present application shall be subject to the appended claims.

What is claimed is:

1. A three-dimensional scanning system comprising:
a control apparatus configured to determine a planned scanning path for a to-be-measured object based on a historical scanning path of an object type to which the current to-be-measured object belongs and according to a historical pose and a current pose of a rotary table carrying the to-be-measured object; and
a mechanical arm that drives a scanner to scan the to-be-measured object according to the planned scanning path under control of the control apparatus,
wherein the control apparatus is further configured to carry out effect verification on the planned scanning path to simulate acquisition of a three-dimensional model according to a preset position and speed of operation of the rotary table and the planned scanning path of the mechanical arm, and to determine whether to revise the position and speed of operation of the rotary table and the planned scanning path.

2. The three-dimensional scanning system according to claim 1, wherein the current pose is a pose of the rotary table adjusted based on the historical pose to adapt to the to-be-measured object.

3. The three-dimensional scanning system according to claim 1, further comprising:
a plurality of rotary tables, wherein each of the rotary tables is used for carrying an object of a preset object type.

4. The three-dimensional scanning system according to claim 3, wherein the current pose is a pose of a rotary table selected from the plurality of rotary tables for carrying the current to-be-measured object.

5. The three-dimensional scanning system according to claim 3, wherein the object type is determined according to identity information and/or a model file of the to-be-measured object.

6. The three-dimensional scanning system according to claim 1, further comprising:
a tracking apparatus configured to track markers disposed on the rotary table to obtain the current pose of the rotary table.

7. The three-dimensional scanning system according to claim 1, wherein the control apparatus is further configured to carry out security verification on the planned scanning path to simulate whether a collision with other objects or a mechanical arm body occurs during operation according to the planned scanning path of the mechanical arm, and to determine whether to revise the planned scanning path.

8. A scanning path planning method of a three-dimensional scanning system, the method comprising:
acquiring, by a processor, a historical scanning path of an object type to which a to-be-measured object belongs;
acquiring, by the processor, a historical pose of a rotary table for carrying the to-be-measured object;
storing, to a memory, the historical scanning path and the historical pose;
acquiring, by the processor, a current pose of the rotary table;
determining a planned scanning path of the to-be-measured object by the processor performing data processing with a stored computer program and based on the stored historical scanning path and according to the stored historical pose and the current pose of the rotary table;
carrying out security verification, by the processor, on the planned scanning path to simulate whether a collision with other objects or a mechanical arm body occurs during operation according to the planned scanning path of the mechanical arm, and determining whether to revise the planned scanning path;
carrying out effect verification, by the processor, on the planned scanning path to simulate acquisition of a three-dimensional model according to a preset position and speed of operation of the rotary table and the planned scanning path of the mechanical arm, and determining whether to revise the position and speed of operation of the rotary table and the planned scanning path; and
controlling, according to the planned scanning path, a scanner to scan a surface of an object, and generating three-dimensional data of the surface of the object.

9. The scanning path planning method according to claim 8, wherein the current pose is a pose of the rotary table adjusted based on the historical pose to adapt to the to-be-measured object.

10. The scanning path planning method according to claim 8,
wherein the current pose is a pose of a rotary table selected from a plurality of rotary tables for carrying the to-be-measured object, and
wherein each of the plurality of rotary tables is used for carrying a to-be-measured object of a preset object type.

11. The scanning path planning method according to claim 10, wherein the object type is determined according to identity information and/or a model file of the to-be-measured object.

12. The scanning path planning method according to claim 8, wherein the current pose is obtained by tracking markers disposed on the rotary table.

13. A three-dimensional scanning method comprising:
acquiring registration information of a to-be-measured object;
determining, according to the registration information, whether to configure a scanning path or adjust a historical scanning path, so as to generate a planned scanning path;
controlling, according to the planned scanning path, a scanner to scan a surface of the object, and generating three-dimensional data of the surface of the object; and
carrying out effect verification on the planned scanning path to simulate acquisition of a three-dimensional model according to a preset position and speed of operation of the rotary table and the planned scanning path of the mechanical arm, and to determine whether to revise the position and speed of operation of the rotary table and the planned scanning path.

14. The three-dimensional scanning method according to claim 13, wherein the adjusting a historical scanning path comprises, based on determining that the registration information of the to-be-measured object is found in a database:
acquiring a historical scanning path of an object type to which the to-be-measured object belongs;
acquiring a historical pose of a rotary table for carrying the to-be-measured object;
acquiring a current pose of the rotary table; and
determining a planned scanning path of the to-be-measured object based on the historical scanning path and according to the historical pose and the current pose of the rotary table.

15. The three-dimensional scanning method according to claim 14, wherein the current pose is a pose of the rotary table adjusted based on the historical pose to adapt to the to-be-measured object.

16. The three-dimensional scanning method according to claim 14,
   wherein the current pose is a pose of a rotary table selected from a plurality of rotary tables for carrying the to-be-measured object, and
   wherein each of the plurality of rotary tables is used for carrying a to-be-measured object of a preset object type.

17. The three-dimensional scanning method according to claim 13, wherein the configuring a scanning path comprises, based on determining that the registration information of the to-be-measured object is not found in a database of a control apparatus:
   acquiring a pose of a rotary table carrying the to-be-measured object; and
   generating the scanning path.

* * * * *